United States Patent
Hong

(10) Patent No.: US 7,319,553 B2
(45) Date of Patent: *Jan. 15, 2008

(54) OPTICAL MODULATOR MODULE PACKAGE STRUCTURE

(75) Inventor: Suk Kee Hong, Seoul (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/358,537

(22) Filed: Feb. 21, 2006

(65) Prior Publication Data

US 2006/0222313 A1    Oct. 5, 2006

(30) Foreign Application Priority Data

Apr. 1, 2005    (KR) .................. 10-2005-0027543

(51) Int. Cl.
  *G02B 26/00*    (2006.01)
  *G02B 5/18*    (2006.01)

(52) U.S. Cl. ............... 359/291; 359/245; 359/254; 359/263; 359/295; 359/298; 359/318; 359/562; 359/572; 359/573; 359/574; 257/81; 257/84; 257/99; 257/433; 257/437; 257/602; 257/678; 257/720; 257/730; 257/778

(58) Field of Classification Search ............... 359/245, 359/254, 259, 263, 290, 291, 295, 298, 318, 359/562, 572–574; 257/81, 84, 99, 433–435, 257/437, 602, 678, 720, 730, 778

See application file for complete search history.

(56) References Cited

U.S. PATENT DOCUMENTS

| 5,311,360 | A |  | 5/1994 | Bloom et al. |
| 6,558,976 | B2 | * | 5/2003 | Shrauger ............... 257/730 |
| 7,116,456 | B2 | * | 10/2006 | Hwang et al. ............ 359/223 |
| 2006/0078247 | A1 | * | 4/2006 | Lee et al. ............... 385/14 |

\* cited by examiner

*Primary Examiner*—Evelyn A. Lester
(74) *Attorney, Agent, or Firm*—Christensen O'Connor Johnson Kindness PLLC

(57) ABSTRACT

Disclosed herein is an optical modulator module package structure. In the optical modulator module package structure, an optical modulator device and a drive integrated circuit device are flip-chip bonded to a substrate, and an opening of the substrate is blocked using a piece of glass.

7 Claims, 7 Drawing Sheets

(A-A')

(B-B')

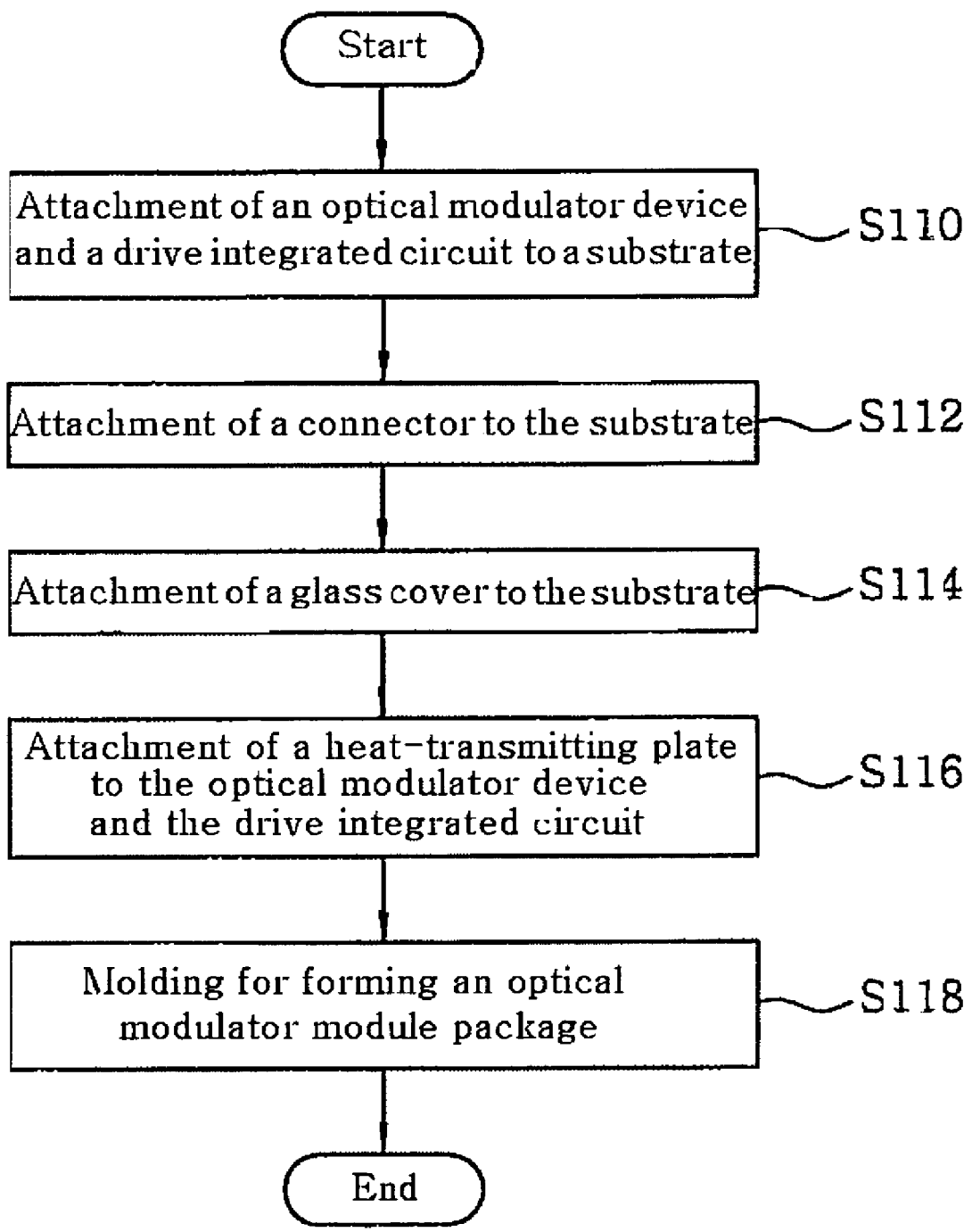

OPTICAL MODULATOR MODULE PACKAGE STRUCTURE

BACKGROUND OF THE INVENTION

1. Field of the Invention

The present invention relates, in general, to an optical modulator module package structure and, more particularly, to an optical modulator module package structure in which an optical modulator device and a drive integrated circuit are flip-chip bonded to a substrate, and an opening is blocked using a piece of glass.

2. Description of the Related Art

Recently, micromachining technology has been developed to produce microoptical parts, such as micromirrors, microlenses, and switches, micro-inertial sensors, micro-biochips, and micro-radio communication devices using a process for fabricating semiconductor devices.

Additionally, a MEMS (microelectromechanical system) field, including the micromachining technology and devices and systems produced using this technology, has come to be considered a fabrication technology and an application field.

The MEMS, which means a microelectromechanical system or device, is applied to an optical field. It is possible to produce optical parts having a size of less than 1 mm using micromachining technology. Thereby, it is possible to realize a microoptical system.

The microoptical system is applied to information communication devices, information displays, and recording devices, due to advantages such as rapid response speed, small loss, and ease of integration and digitization.

For example, the microoptical parts, such as micromirrors, microlenses, and optical fiber fixtures, may be applied to devices for storing and recording information, large-screen displays, optical communication devices, and adaptive optics.

In connection with this, micromirrors have been commercialized, or its commercialization has been studied for application to large-screen displays, optical signal distributors, bar code scanners, and optical signal reducers.

Meanwhile, the demand for large screens is growing day by day. In many meetings or exhibitions, participants or spectators receive strong impressions from drawings, pictures, and moving pictures having brilliant colors. Now that large-screen displays have appeared, many people can simultaneously see large screens in meetings in bright locations so that they can see data from their tables.

In most current large-screen displays (for the most case, projectors), a liquid crystal is used as an optical switch. In comparison with conventional CRT projectors, they are small and low-priced, and their optical systems are simple, thus they are frequently used. However, since light is radiated from a light source through a liquid crystal plate to a screen, they are disadvantageous in that optical loss is high.

Recently, optical efficiency has been improved but intrinsic reduction in efficiency during transmission cannot be avoided. In order to further improve optical efficiency and to obtain a clearer image, a commercial device for displaying a large screen using a micromirror has been developed.

As an example of the micromirror used in the large-screen display, there is a reflective-type deformable lattice optical modulator 10, as shown in FIG. 1. The optical modulator 10 is disclosed in U.S. Pat. No. 5,311,360 by Bloom et al. The modulator 10 comprises a reflective surface part and a plurality of reflective-type deformable ribbons 18 which are suspended over an upper side of a substrate 16 and are spaced apart from each other at regular intervals. An insulating layer 11 is deposited on the silicon substrate 16. Subsequently, a sacrificial silicon dioxide film 12 and a silicon nitride film 14 are deposited.

The nitride film 14 is patterned by the ribbons 18, and the silicon dioxide layer 12 is partially etched so that the ribbons 18 are maintained on an oxide spacer layer 12 by a nitride frame 20.

In order to modulate light having a single wavelength of $\lambda_o$, the modulator is designed so that the thickness of the ribbon 18 and the thickness of the oxide spacer 12 are each $\lambda_o/4$.

The lattice amplitude of the modulator 10, which is defined by the distance (d) between a reflective surface 22 of the ribbon 18 and a reflective surface of the substrate 16, is controlled by applying voltage between the ribbon 18 (the reflective surface 22 of the ribbon 16 acting as a fast electrode) and the substrate 16 (a conductive film 24 on a lower side of the substrate 16 acting as a second electrode).

Meanwhile, in order to commercialize the optical modulator, it is necessary to modularize it, and many characteristics must be considered to achieve modularization.

SUMMARY OF THE INVENTION

Accordingly, the present invention has been made keeping in mind the above problems occurring in the prior art, and an object of the present invention is to provide an optical modulator module package in which, since it is unnecessary to pattern a glass substrate, the cost is reduced.

Another object of the present invention is to provide an optical modulator module package in which since wire bonding is unnecessary, the process is simplified.

In order to accomplish the above objects, the present invention provides an optical modulator module package structure. The optical modulator module package structure comprises: an optical modulator device, in which an active portion reflects or diffracts incident light depending on an input external control signal, a drive integrated circuit device, controlling the active portion of the optical modulator device depending on the external control signal, a substrate having an opening to pass incident light therethrough, to an upper side of which the optical modulator device is attached so that the active portion corresponds in position to the opening and which has an internal circuit so that the external control signal is transported to the drive integrated circuit device therethrough and a control signal of the drive integrated circuit device is transported to the optical modulator device therethrough, the drive integrated circuit device being formed around the optical modulator device, and a light transmissive cover which is made of a light transmissive material to cover the opening of the substrate.

BRIEF DESCRIPTION OF THE DRAWINGS

The above and other objects, features and advantages of the present invention will be more clearly understood from the following detailed description taken in conjunction with the accompanying drawings, in which:

FIG. 5 is a flowchart illustrating the fabrication of the optical modulator module package structure according to the embodiment of the present invention.

DESCRIPTION OF THE PREFERRED EMBODIMENTS

Hereinafter, a detailed description will be given of a preferred embodiment of the present invention, referring to the accompanying FIGS. 2 to 5.

Figure 1:
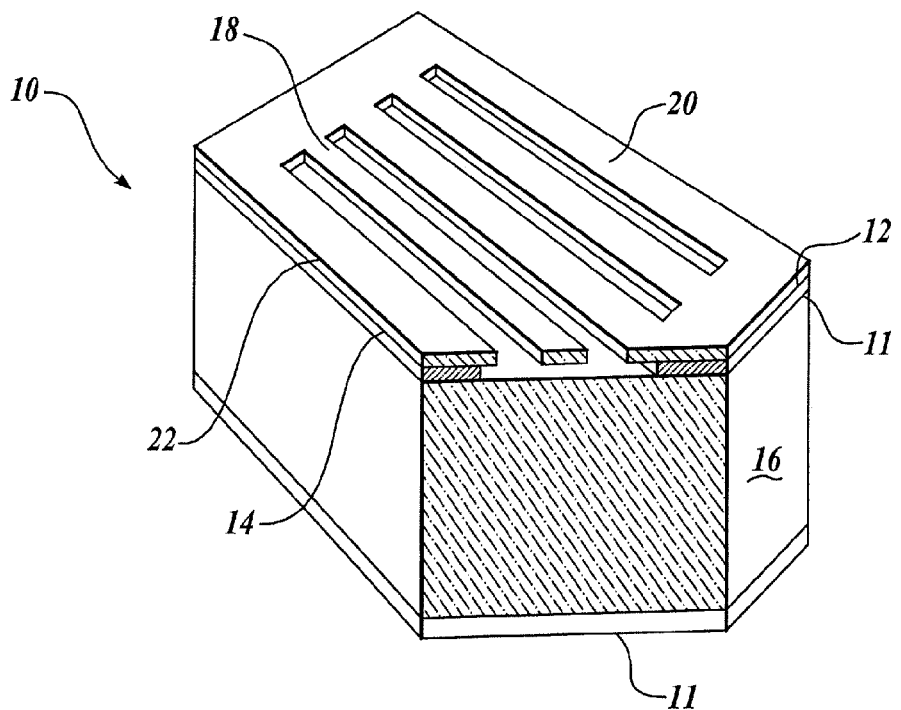
FIG. 1 illustrates an electrostatic lattice optical modulator according to the conventional technology.
Figure 2:
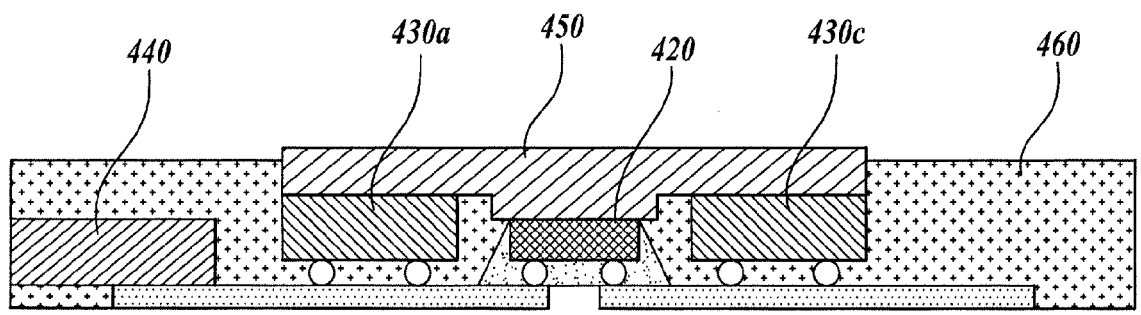
FIG. 2 is a sectional view of an optical modulator module package structure according to an embodiment of the present invention.

FIG. 2 is a sectional view of an optical modulator module package structure according to a preferred embodiment of the present invention.

Referring to the drawing, the optical modulator module package structure according to the preferred embodiment of the present invention comprises a glass cover 410, a substrate 415, an optical modulator device 420, drive integrated circuits 430a-430d (only 430a and 430c are shown in the drawing because it is a sectional view), a connector 440, a heat-transmitting plate 450, and a molding 460.

The glass cover 410 is preferably made of a glass material having good quality so as to nicely pass incident light therethrough, and may also be made of a light-transmissive material. It is desirable to coat it to avoid undesired reflections and to improve or reduce reflections.

The glass cover 410 is attached to the substrate 415 on a surface thereof and blocks an opening of the substrate 415.

The optical modulator device 420 is flip-chip bonded to the substrate 415, and an adhesive is formed around the optical modulator device 420 to block the optical modulator device 420 from the external environment. In connection with this, a representative example of the substrate 415 is a printed circuit board, and may be exemplified by a substrate having internal wires, such as LTCC, FPCB, or a glass substrate. Furthermore, it is preferable that the substrate 415 be patterned to include bumps for flip-chip bonding, and be wired therein.

Additionally, the drive integrated circuits 430a-430d are flip-chip bonded around the optical modulator device 420 attached to the substrate 415, and the optical modulator device 420 is electrically connected to the drive integrated circuits 430a-430d through wires formed on the substrate 415.

Next, the heat-transmitting plate 450 is provided to transmit heat generated from the optical modulator device 420 and the drive integrated circuits 430a-430d therethrough, and is made of a metallic material capable of efficiently transmitting heat therethrough. In connection with this, if the heights of the drive integrated circuits 430a-430d and the optical modulator device 420 are compared with each other in the drawing, the optical modulator device 420 is seen to be higher.

Accordingly, the heat-transmitting plate 450 for transmitting heat, which is generated from the optical modulator device 420 and the drive integrated circuits 430a-430d, therethrough must protrude at a part thereof corresponding in position to the optical modulator device 420.

The connector 440 is connected to an end of the substrate 415 to receive a control signal from an external control circuit and transport the signal through the wires formed in the substrate 415 to the drive integrated circuits 430a-430d.

Meanwhile, as described above, after the substrate 415, on which the optical modulator device 420, the drive integrated circuits 430a-430d, and the connector 440 are formed, the glass cover 415, and the heat-transmitting plate 450 are layered, molding is conducted to firmly fix the above parts so as to shield them from external impact.

Figure 3A:
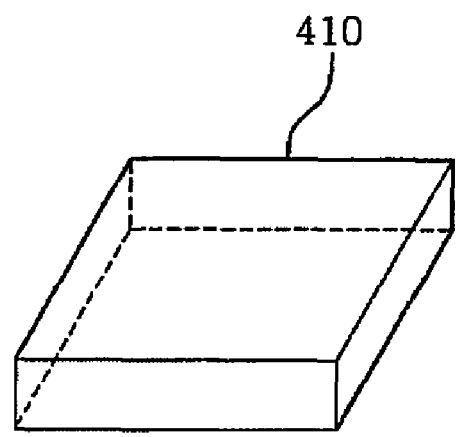
FIGS. 3A to 3C are perspective views of a glass, a substrate, and a heat-transmitting plate of FIG. 2, respectively.
Figure 3B:
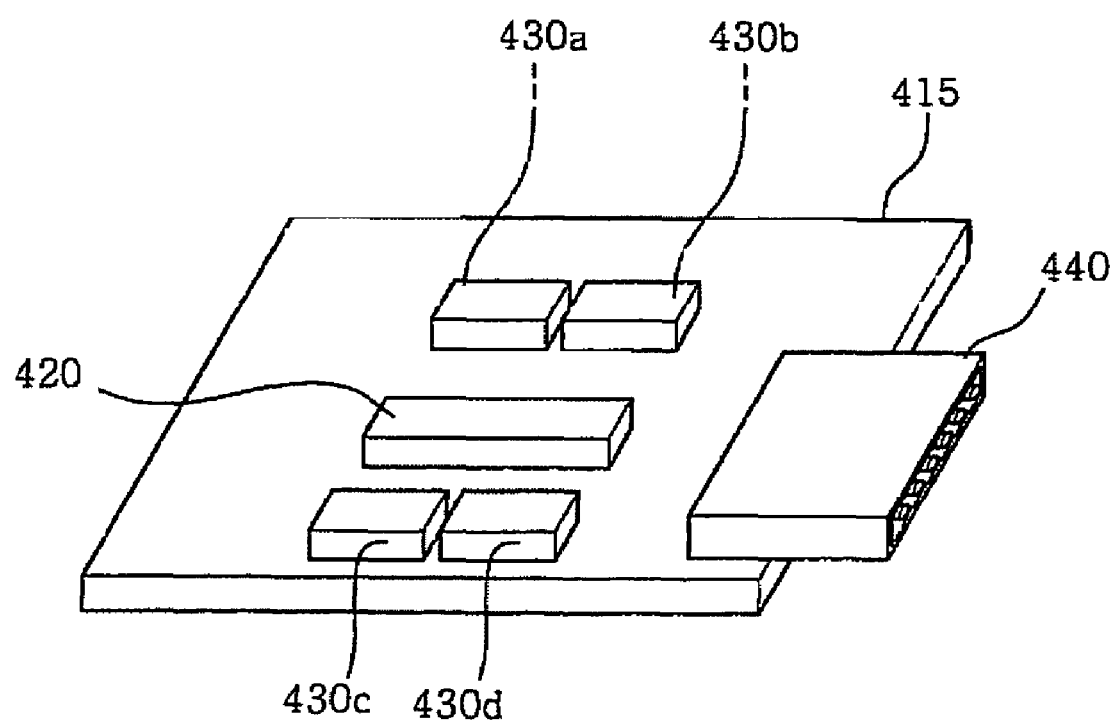
Figure 3C:
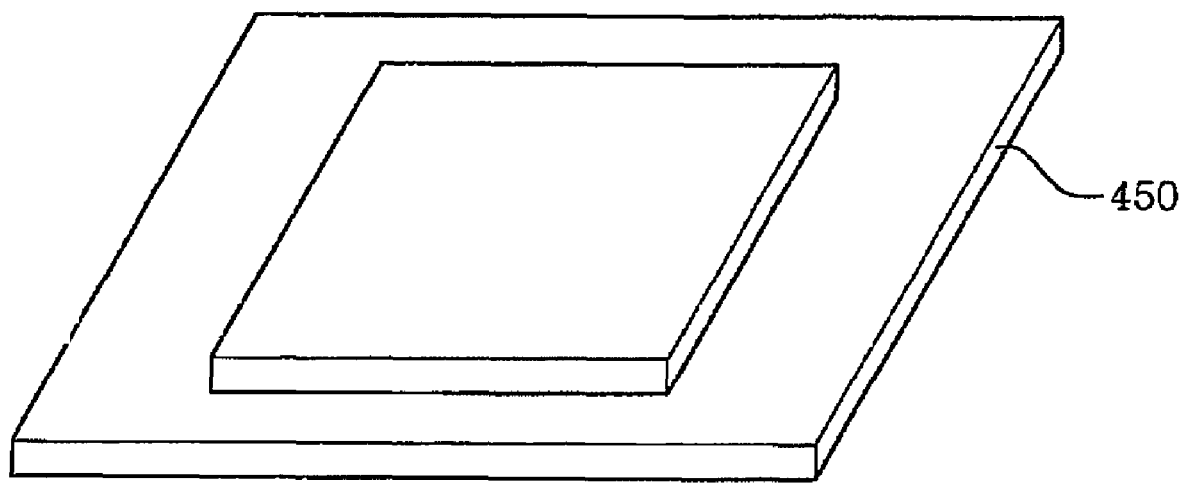

FIGS. 3A to 3C illustrate exploded perspective views of the optical modulator module package according to the preferred embodiment of the present invention.

Referring to FIG. 3A, in the optical modulator module package structure according to the preferred embodiment of the present invention, the glass cover 410 is preferably made of a glass material having good quality so as to nicely pass incident light therethrough, and may also be made of a light-transmissive material. It is desirable to coat it to avoid undesired reflections and to improve or reduce reflections.

The glass cover 410 blocks an opening of the substrate 415 to protect the optical modulator device 420.

Referring to FIG. 3B, in the optical modulator module package according to the preferred embodiment of the present invention, the substrate 415 has a fine pattern formed therein and is attached to the optical modulator device 420 at an upper surface thereof, and the drive integrated circuits 430a-430d are attached thereto around the optical modulator device 420.

As shown in the drawing, the optical modulator device 420 has a rectangular section, one side thereof being longer than the other side. The drive integrated circuits 430a-430d have a rectangular section and are smaller than the optical modulator device 420 in size, and the number thereof may be changed if necessary. The substrate 410 has an opening which corresponds in position to the optical modulator device 420 so as to pass light therethrough, and incident light can penetrate therethrough and light modularized by the optical modulator device 420 can be reflected or diffracted thereby.

The substrate 415 has a fine pattern therein, and a control signal which is input through the connector 440 is transported therethrough to the drive integrated circuits 430a-430d.

The connector 440 is attached to a portion of the substrate 415 to receive the control signal from an external control circuit, and it is preferable that an end of the connector 440 slightly protrude from the side of the substrate 415.

The connector 440 is attached to the substrate 415 using an adhesive, and then firmly fixed by molding 460.

With reference to FIG. 3C, the heat-transmitting plate 450 according to the preferred embodiment of the present invention partially protrudes so as to come into contact with the optical modulator device 420, and has a flat surface so as to come into contact with the drive integrated circuits 430a-430d.

Figure 4A:
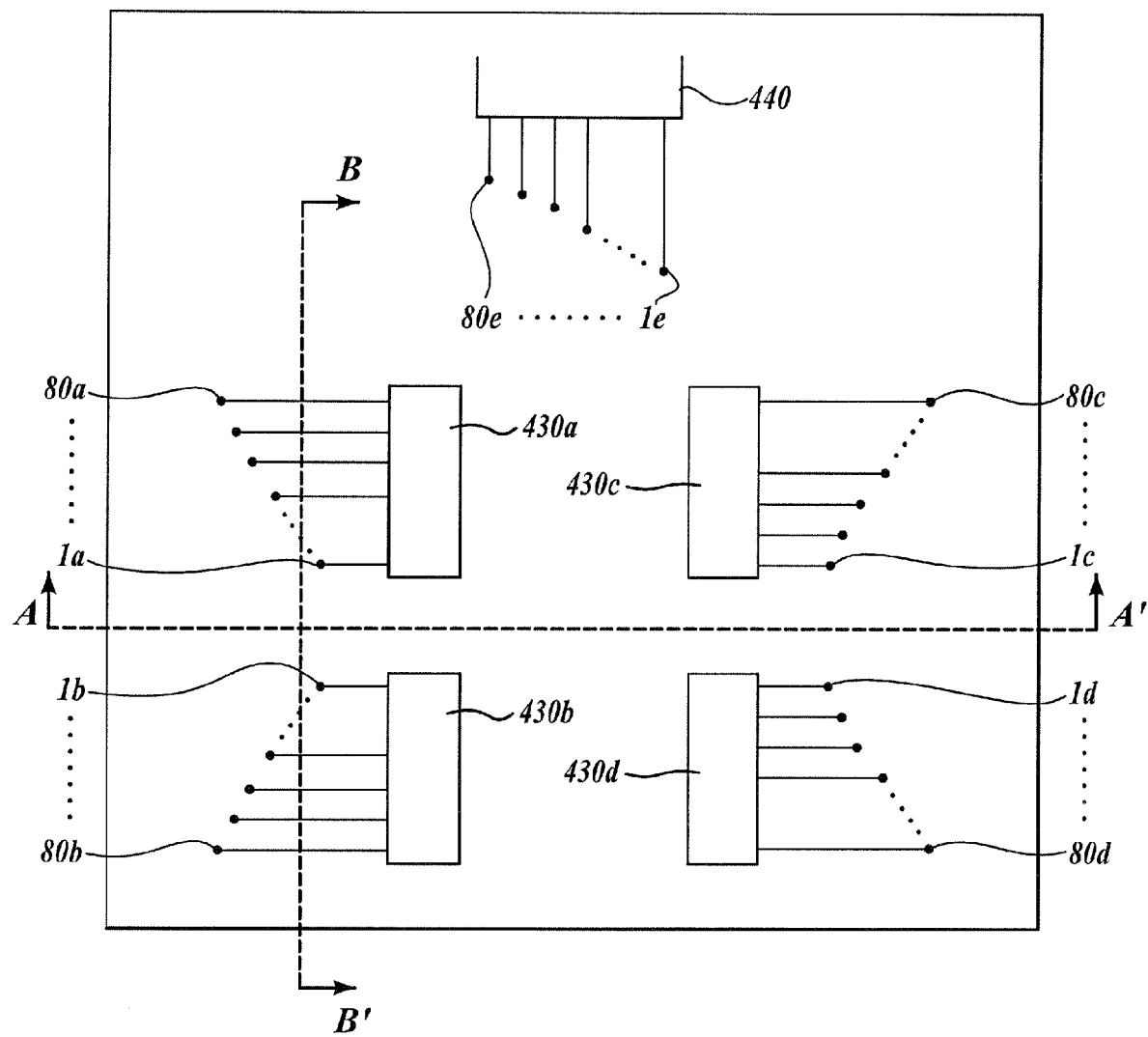
FIGS. 4A and 4B are plan views of layers showing wiring of the substrate of FIG. 2, and FIGS. 4C and 4D are sectional views showing wiring of the substrate of FIG. 2.
Figure 4B:
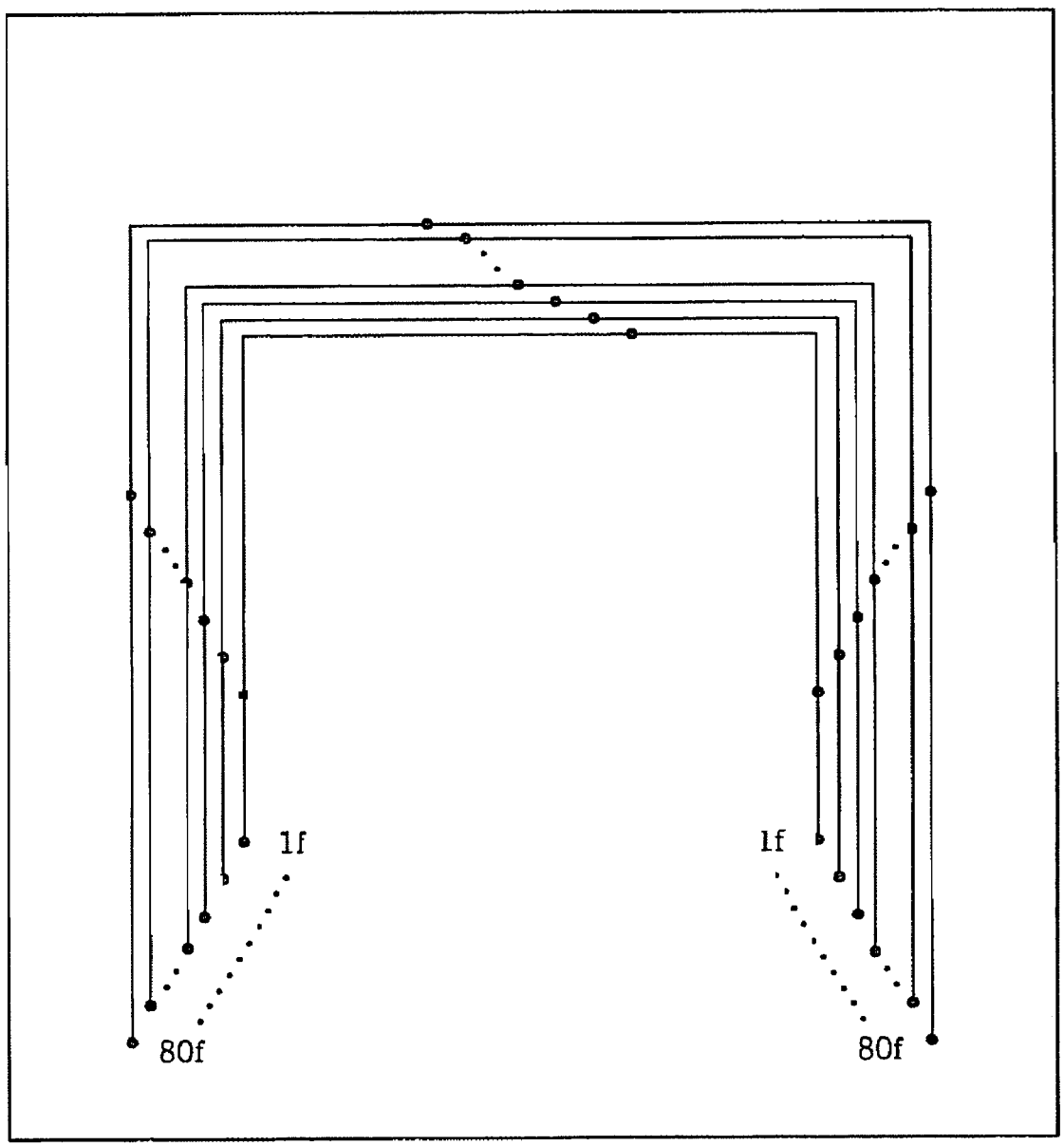
Figure 4C:
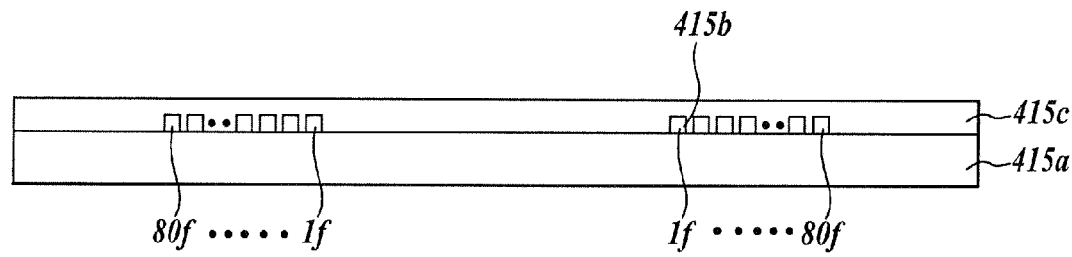
Figure 4D:
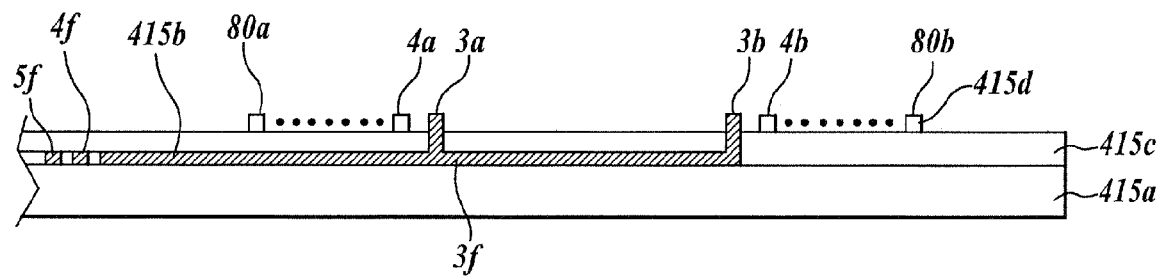

FIGS. 4A and 4B are plan views of layers showing the wiring of the substrate of FIG. 2, and FIGS. 4C and 4D are sectional views showing the wiring of the substrate of FIG. 2.

For the convenience of description, the position of the connector is slightly shifted in FIGS. 4A to 4D. In the drawings, the wiring is conducted to form a two-layered structure. Compact wiring may be conducted through a similar method.

With reference to FIG. 4A, for example, if the number of signal lines output from the drive integrated circuits 430a-430d is 80, signal lines 1a-80a are output from the drive integrated circuit 430a, signal lines 1b-80b are output from the drive integrated circuit 430b, signal lines 1c-80c are output from the drive integrated circuit 430c, and signal lines 1d-80d are output from the drive integrated circuit 430d. At this time, the number of signal lines input from an external control circuit is 80, thus the number of signal lines which are connected to the connector 440 is 80. These signal lines are designated by 1e-80e in the drawing.

The signal lines shown in FIG. 4A are arranged so that the outermost line is longest and the inner signal line is shorter than the adjacent signal line. Furthermore, the signal lines of the adjacent drive integrated circuits (reference numerals 430a to 430b and 430c to 430d) are symmetrical.

As well, via holes are formed at ends of the signal lines to provide an electrical connection to the lower layer of FIG. 4B.

FIG. 4B is a plan view of the lower layer of the substrate 415, in which wires are formed in a "[" shape. In connection with this, dots denote via holes for connecting the wires of the upper layer to the wires of the lower layer therethrough.

FIG. 4C is a sectional view taken along the line A-A' of FIG. 4A, in which a circuit layer 415b corresponding to the wires of FIG. 4B is formed on an insulating layer 415a of the substrate 415 and an insulating layer 415c is formed thereon to provide electrical insulation to the upper layer.

FIG. 4D is a sectional view taken along the line B-B' of FIG. 4A, in which internal wires are clearly shown. As shown in the drawing, the third signal line 3a of the drive integrated circuit 430a of the upper layer is connected through the via hole to the third wire 3f of the lower layer, and the third signal line 3b of the drive integrated circuit 430b of the upper layer is connected through the via hole to the third wire 3f of the lower layer.

In connection with this, the third wire 3f is electrically connected to the upper layer through the via hole at a front side of the connector 440 and the wire of the upper layer is electrically connected to the connector 440.

FIG. 5 is a flowchart illustrating the fabrication of the optical modulator module package structure according to the embodiment of the present invention.

Referring to the drawing, a method of fabricating the optical modulator module package structure according to the embodiment of the present invention comprises preparing a substrate having internal wires, through which an opening is formed so as to correspond in position to a portion to which an optical modulator device is to be attached and on which a flip-chip bonding pad is formed, attaching the optical modulator device to one side of the substrate so that the optical modulator device corresponds in position to the opening of the substrate, and attaching drive integrated circuits around the optical modulator device (S110).

Additionally, a connector is attached to the side of the substrate to which the optical modulator device and the drive integrated circuits are attached (S112).

Next a glass cover is attached to a portion of the substrate to which the optical modulator device and the drive integrated circuits are attached so as to correspond in position to the opening and consequently block the opening (S114).

Subsequently, a heat-transmitting plate is attached to rear sides of the optical modulator device and the drive integrated circuits (S116), and molding is conducted to create the optical modulator module package structure (S118).

As described above, the present invention is advantageous in that since it is unnecessary to conduct wire bonding and die bonding steps, the process is simplified.

Another advantage is that since it is unnecessary to pattern a glass cover, the cost is reduced.

Other advantages are that it is easy to achieve miniaturization because the size is reduced, and the yield is increased because the process is simplified.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An optical modulator module package structure, comprising:
    an optical modulator device, in which an active portion reflects or diffracts incident light depending on an input external control signal;
    a drive integrated circuit device controlling the active portion of the optical modulator device depending on the external control signal;
    a substrate having an opening to pass incident light therethrough, to an upper side of which the optical modulator device is attached so that the active portion corresponds in position to the opening and which has an internal circuit so that the external control signal is transported to the drive integrated circuit device therethrough and a control signal of the drive integrated circuit device is transported to the optical modulator device therethrough, the drive integrated circuit device being formed around the optical modulator device; and
    a light transmissive cover which is made of a light transmissive material to cover the opening of the substrate.

2. The optical modulator module package structure as set forth in claim 1, further comprising:
    a connector attached to an end of the substrate to receive the external control signal; and
    a molding part which surrounds a structural body including the optical modulator device, the drive integrated circuit device, the substrate, the light transmissive cover, and the connector, so as to shield the structural body.

3. The optical modulator module package structure as set forth in claim 1, wherein the light transmissive cover has an absorption or scattering film applied on an upper side thereof.

4. The optical modulator module package structure as set forth in claim 1, further comprising a heat-transmitting plate attached to the optical modulator device and the drive integrated circuit device to transmit heat therethrough.

5. The optical modulator module package structure as set forth in claim 1, wherein the light transmissive cover is a glass substrate.

6. The optical modulator module package structure as set forth in claim 1, wherein the substrate is any one of PCB, LTCC, FPCB, and a glass substrate.

7. The optical modulator module package structure as set forth in claim 1, wherein the substrate comprises a plurality of bumps to conduct flip-chip bonding.

* * * * *